March 24, 1925.

G. T. RANDLE

AIR MIXING AND FILTERING DEVICE

Filed Jan. 18, 1923

1,530,619

Inventor
George T. Randle,
By Louis M. Schmidt,
Atty.

Patented Mar. 24, 1925.

1,530,619

UNITED STATES PATENT OFFICE.

GEORGE T. RANDLE, OF SAYLESVILLE, RHODE ISLAND, ASSIGNOR TO THE MOTOR PROTECTION COMPANY, OF CENTRAL FALLS, RHODE ISLAND, A CORPORATION.

AIR MIXING AND FILTERING DEVICE.

Application filed January 18, 1923. Serial No. 613,545.

*To all whom it may concern:*

Be it known that I, GEORGE T. RANDLE, a citizen of the United States, residing at Saylesville, in the county of Providence and State of Rhode Island, have invented certain new and useful Improvements in Air Mixing and Filtering Devices, of which the following is a specification.

My invention relates to improvements in air mixing and filtering devices, of the form for use in combination with cooling systems for electric motors, one form of which systems is shown and described in the patent granted to John William Nolan under date of March 21, 1916, No. 1,175,977, and adapted to be installed in the conduit line for delivering the cooling air to the motor, and the object of my improvement is to produce an air mixing and filtering device in the form of a unitary, self-contained structure that comprises at one end a dust collector for filtering the air, preferably at the delivery end, and that has at the other or receiving end an inlet for the outside air and also an additional inlet for admitting air from the room or apartment in which the motor is installed, and also has means of convenient form for adjusting the effective openings for said inlets, whereby the proportion of outside and inside air that is admitted to the motor can be varied.

In the accompanying drawing:—

Figure 1:
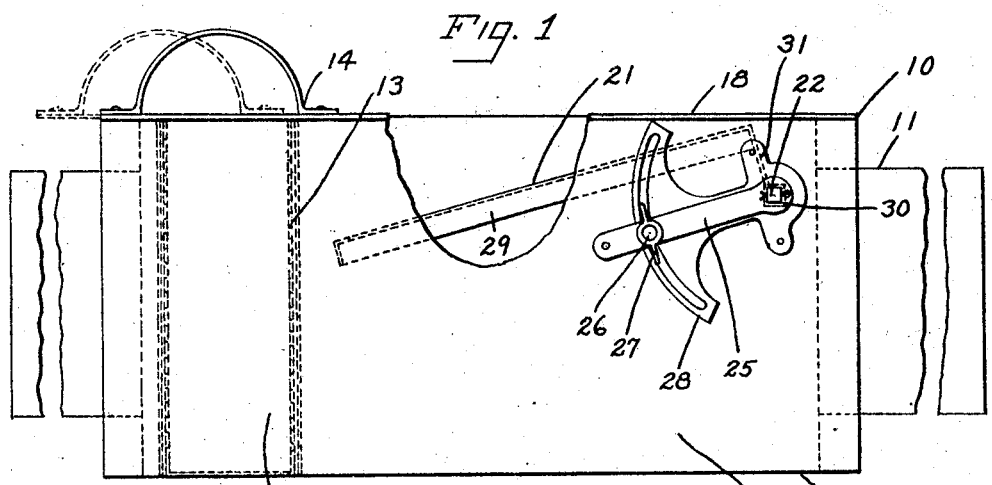
Figure 1 is a side elevation of my improved air mixing and filtering device, being in part broken away to show a portion of the damper.
Figure 2:
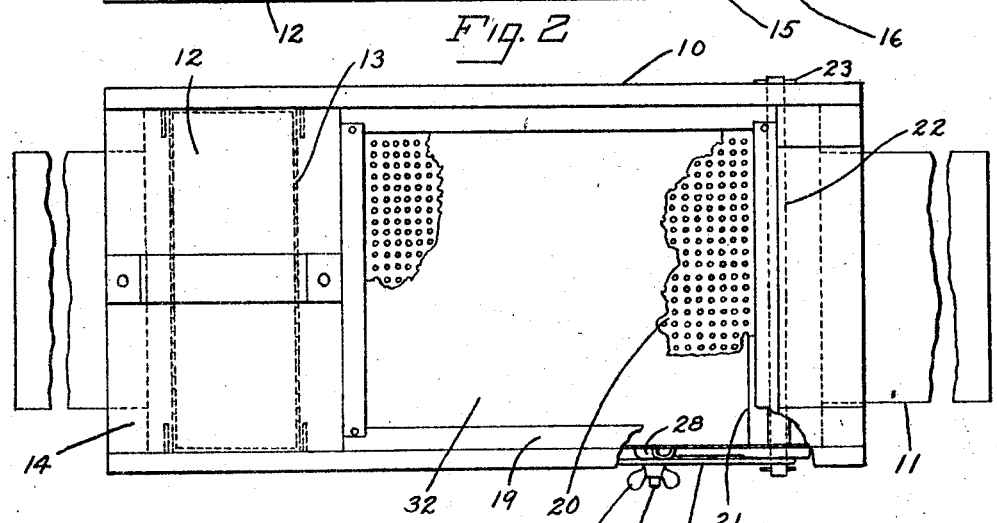
Figure 2 is a plan view of the same, being also in part broken away to show the damper locking mechanism.
Figure 3:
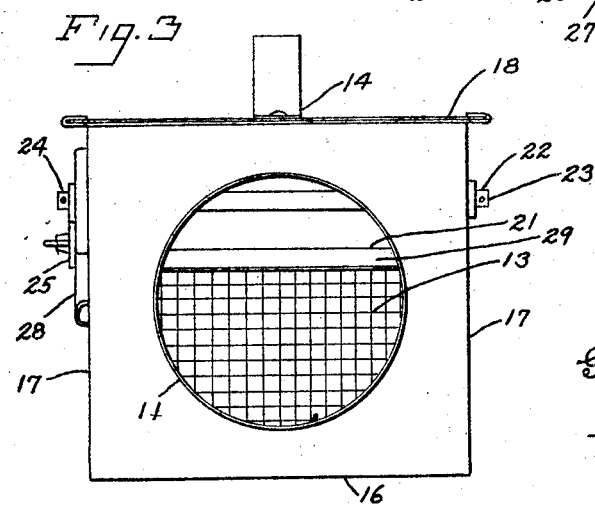
Figure 3 is an end elevation of the same, as viewed from the inlet or receiving end.

My improved air mixing and filtering device is made of sheet metal and comprises a box-like body portion 10 of rectangular or substantially square form of cross-section and appreciable length that is provided at the ends with terminals 11 of cylindrical form that are adapted to make connection with the conduit structure for delivering the air to the motor on one side and for receiving the outside air on the other side of the device.

As shown, the terminal 11 at the right is connected to the conduit that receives the outside air and the terminal 11 at the left is connected to the conduit that delivers the air to the motor, and which may consist of a mixture of the outside air and air from within the room.

The body portion 10 comprises at the left or delivery end a compartment 12 in the form of a dust collector in which the filtering of the air is effected and which compartment is defined by end walls 13 of wire mesh and which may be provided at the upper side with a cover or door 14 that may be opened and closed by a sliding movement.

The walls 13 are spaced apart so as to admit therebetween the filtering structure which may be of ordinary form, such materials as horsehair being used or any material that will serve to prevent the passage of solid particles that are suspended in the air.

The major portion of the body 10, at the right or receiving side of the dust collector 12, is the structure of the air mixer 15.

Said air mixer 15, as shown, comprises a closed and flat bottom 16, parallel and flat side walls 17, and a top or roof 18 that is for the most part open.

Said roof 18 comprises a rectangular skeleton border or frame 19 having the opening bridged by means of perforated sheet metal, as shown, or by means of relatively fine wire mesh 20, otherwise substantially like that that is used for the end walls of the dust collector compartment 12.

In use, warm air is admitted from the room through the screened opening 32 described.

In order to control the relative quantity of warm air from the room and cold air from outside a damper or gate 21 is provided in the air mixture 15.

As shown, said damper 21 is supported from a shaft 22 that is itself supported from the side walls 17, the ends of the shaft projecting through said walls and being provided with cotter-pins 23.

Actuating means for the damper 21 are provided mounted on the front end portion 24 of the shaft 22 in the form of the lever 25, positioned preferably in parallelism with the damper 21. Also, locking means are provided in the form of the locking stud 26 and nut 27 that are carried by the lever or crank-arm 25 and cooperate with a slotted quadrant or sector 28.

The damper 21 is a flat-plate-like structure and may be provided with reinforcing flanges 29 at the edges, and as to dimensions, it fits against the sides 17 and in the closed position covers the screened opening 32.

The shaft 22 is of square form of cross-section and the means for supporting the damper 21 therefrom comprise a sleeve 30 that fits over said shaft and a radially directed connecting piece 31 intermediate said sleeve 30 and the rear end portion of the damper 21, said piece 31 serving to compensate for the downward off-set position of the shaft 22 relatively to the top 18.

Thus, notwithstanding the fact that the shaft 22 extends across the interior of the mixing chamber 15 and is located appreciably below the top 18 the damper 21 in the closed position fits snugly against the walls of the opening 32 that is bridged by the screen or mesh 20.

It will be noted that the opening 32 in the top 18 is appreciably greater in area than that in the inlet terminal 11. Also, there is excess of length over the width. Thus a relatively small angular movement serves to change the damper 21 from the position of closing one opening to closing the other.

The utility of the device described is found for the most part during cold weather, when it serves to provide means for preventing the condensation of moisture on the conduits leading to the motor.

With reference to the use of perforated sheet metal for the screening 20 for bridging the opening 32 through which the warm air is admitted, as distinguished from wire mesh such as is used for the other protected openings, said screening 20 is exposed so that in use lint and the like will collect thereon. The sheet metal used permits of the outer face being easily cleaned by simply wiping off, as with a piece of waste.

I claim as my invention:—

As a new article of manufacture, an air mixing and filtering structure comprising a box-like structure that is provided at opposite ends with sleeve-like terminals for use in connecting in an air conduit, the body portion of said structure having at one end a compartment for housing filtering material and having intermediate said compartment and the other end a second compartment that serves as an air mixing chamber, said mixing chamber having an opening in one of the side walls, and a damper in said mixing chamber for controlling the flow of air from said opening and the adjacent end of the body portion, whereby said structure is adapted to be installed in a motor protecting system for treating the air that is delivered to the motor.

GEORGE T. RANDLE.